(12) United States Patent
Egedal (10) Patent No.: US 8,044,529 B2
(45) Date of Patent: Oct. 25, 2011

(54) METHOD OF DAMPING TOWER VIBRATIONS OF A WIND TURBINE AND CONTROL SYSTEM FOR WIND TURBINES

(75) Inventor: Per Egedal, Herning (DK)

(73) Assignee: Siemens Aktiegesellschaft, Munich (DE)

( * ) Notice: Subject to any disclaimer, the term of this patent is extended or adjusted under 35 U.S.C. 154(b) by 407 days.

(21) Appl. No.: 12/383,958

(22) Filed: Mar. 31, 2009

(65) Prior Publication Data
US 2009/0250932 A1 Oct. 8, 2009

(30) Foreign Application Priority Data
Apr. 2, 2008 (EP) .................................... 08006746

(51) Int. Cl.
*F03D 9/00* (2006.01)
(52) U.S. Cl. ........................................... 290/44; 290/55
(58) Field of Classification Search ................ 290/44, 290/55
See application file for complete search history.

(56) References Cited

U.S. PATENT DOCUMENTS

| | | | |
|---|---|---|---|
| 6,420,795 B1 * | 7/2002 | Mikhail et al. ................. | 290/44 |
| 6,891,280 B2 | 5/2005 | Siegrriedsen | |
| 7,569,944 B2 * | 8/2009 | Oohara et al. ................. | 290/44 |
| 7,586,205 B2 * | 9/2009 | Krueger .......................... | 290/44 |
| 7,679,208 B1 * | 3/2010 | Ko et al. ......................... | 290/44 |
| 7,692,322 B2 * | 4/2010 | Wakasa et al. ................. | 290/44 |
| 7,728,452 B2 * | 6/2010 | Arinaga et al. ................ | 290/44 |
| 7,851,934 B2 * | 12/2010 | Nyborg .......................... | 290/44 |
| 7,952,215 B2 * | 5/2011 | Hayashi et al. ................ | 290/44 |
| 2006/0066111 A1 | 3/2006 | Suryanarayanan et al. | |

FOREIGN PATENT DOCUMENTS

| | | |
|---|---|---|
| EP | 1719910 A1 | 11/2006 |
| GB | 2117934 A | 10/1983 |
| WO | 02075153 A1 | 9/2002 |
| WO | 2007010322 A1 | 1/2007 |
| WO | WO 2007/053031 A1 | 5/2007 |
| WO | 2007089136 A2 | 8/2007 |

OTHER PUBLICATIONS

Henricksen, "Model Predictive Control of a Wind Turbine", 2007, i-xii, 1-132, Kongens Lyngby, Technical University of Denmark.

* cited by examiner

*Primary Examiner* — Thanh Lam (57) ABSTRACT

A control system for a wind turbine is provided. A pitch-control unit establishes a pitch-reference signal representing a pitch to be set by the pitch-actuator system. A rotor-speed input receives a signal representing a speed of the rotor. A speed-reference input receives a speed-reference signal for the rotor speed. An inclination-signal input receives a signal representing a tower inclination. A pitch-reference output outputs the pitch reference signal. A modification unit is connected to the speed-reference input to receive the speed-reference signal and connected to the inclination-signal input to receive the inclination signal. The modification unit establishes a modification signal based on the inclination signal, to modify the speed-reference signal via the modification signal, and to output a modified-speed-reference signal. The pitch-control unit connected to the modification unit to receive the modified-speed-reference signal and establish the pitch-reference value at least based on the difference between the modified-speed-reference and the rotor-speed signals.

21 Claims, 7 Drawing Sheets

$a\_y = \ddot{y} - \sin(\Phi) \cdot a\_g$
$a\_y \approx \ddot{y} - \Phi \cdot a\_g$

METHOD OF DAMPING TOWER VIBRATIONS OF A WIND TURBINE AND CONTROL SYSTEM FOR WIND TURBINES

CROSS REFERENCE TO RELATED APPLICATIONS

This application claims priority of European Patent Office application No. 08006746.5 EP filed Apr. 2, 2008, which is incorporated by reference herein in its entirety.

FIELD OF INVENTION

The present invention relates to a method of damping tower vibrations of a wind turbine which is equipped with rotor blades, a pitch controller, and a pitch actuator system, in which the tower vibrations are damped by setting the pitch of the rotor blades. In addition, the present invention relates to a control system for use in a wind turbine which is equipped with rotor blades and a pitch actuator system.

BACKGROUND OF INVENTION

In wind turbines, tower vibrations will be excited by wind conditions in the wind field acting on the wind turbine. In land based wind turbines these tower vibrations are of high frequency and produce only small tower inclinations. However, e.g. wind turbines mounted on floating foundations of the so-called spar-buoy type can have, due to wind conditions, low vibrational frequencies of the tower and large inclinations of the tower and therefore large movements of the nacelle.

A combination of low tower frequency and negative thrust curve at high wind speeds can lead to high tower loads and large inclination variations of the nacelle if the turbine is constant power controlled. In constant power control the wind turbine is usually controlled to maintain approximately a constant rotor speed and the torque of the rotor is regulated by setting an appropriate pitch angle of the turbine blades so as to maintain an approximately constant power. High tower loads and large inclination variations in this power control mode may lead to instabilities and structural failure of the wind turbine. Until now, therefore, wind turbines have not been installed on towers with very low tower frequency (below 0.05 Hz).

In U.S. Pat. No. 6,891,280 B2 a method for operating off-shore wind turbine plants based on the frequency of their towers is disclosed. In this method, it is avoided to operate the plant in a frequency range in which the resonant tower frequency lies. To achieve this, the critical natural frequency of the plant and the speed of the rotor where the plant is excited in its critical natural frequency range are determined. Then, this speed range is avoided during operation of the wind tower plant by operating above or below said critical speed range and, if necessary, by rapidly passing through the critical speed range.

A method of damping tower vibrations of a wind turbine is disclosed in WO 2007/053031 A1. In this method, tower Eigen vibrations are damped by an angular increment $\Delta\beta$ which is added to the blade pitch angle. This increment is calculated on the basis of the tower velocities, in order to counteract the Eigen vibrations.

A method for damping vibrations of a wind turbine tower is disclosed in US 2006/0066111 A1. In this method the generator demand torque is modulated by providing a signal based on changes in the generator rotor speed.

SUMMARY OF INVENTION

With respect to the mentioned state of the art it is a first objective of the present invention to provide an improved method of damping tower vibrations of a wind turbine. It is a second objective of the present invention to provide an improved control system for use in a wind turbine.

The first objective is solved by a method of damping tower vibrations of a wind turbine and the second objective is solved by an control system for use in a wind turbine as claimed in independent claims. The depending claims contain further developments of the invention.

In the inventive method of damping tower vibrations of a wind turbine which is equipped with rotor blades, a pitch controller, and a pitch actuator system, the damping is done by setting the pitch of the rotor blades. The pitch angle of the rotor blades is controlled according to a pitch reference value which represents a pitch to be set by the pitch actuating system. Determining the pitch reference value is done in the following way: A speed reference value for the rotor speed and a rotor speed value representing the actual speed of the rotor are provided. A modification value representing a modification to be done for taking into account the tower vibrations, in particular the tower vibrations at the tower top, for example, at the location of the nacelle, is provided. The modification value is then used to modify the speed reference value to establish a modified speed reference value. The pitch reference value is then determined on the basis of at least the difference between the modified speed reference value and the actual rotor speed value.

While in the state of the art the pitch angle is calculated based on the difference between an unmodified speed reference value and the actual rotor speed value, and a modification is done to the pitch angle for damping tower vibrations, in the present invention the speed reference value is modified instead of the pitch angle. This allows for damping very slow tower frequencies which is not easily possible with the state of the art.

The modification value by which the speed reference value is modified may, in particular, represent the tower velocity caused by the tower vibrations, in particular by the tower vibrations at the tower top, for example at the location of the nacelle. The tower velocity value is then added to the speed reference value to establish the modified speed reference value. While in the state of the art the tower speed is incorporated into the pitch angle, it is incorporated into the speed reference value instead in the present implementation of the invention.

The tower velocity value may, for example, be calculated from an inclination value representing the inclination of the tower caused by the tower vibrations. Differentiating the inclination value easily leads to the tower velocity value. This inclination may for example be measured in the nacelle or at the nacelle of the wind turbine.

In a further development of the inventive method a fore-aft acceleration value, which represents the tower acceleration in the direction of the rotor axis and which is caused by the tower vibrations, is used to represent the inclination value. Establishing the change of inclination by use of this fore-aft acceleration value may be done by forming the derivative of the ratio of the fore-aft acceleration value to the gravity acceleration acting on the tower top. Even large inclination angles of the tower are relatively small compared to an angle of 90°. Therefore, the ratio of the fore-aft acceleration value to the gravity acceleration can be approximated by the inclination angle expressed in radiant, rather than the sine of the inclination angle. In other words, the fore-aft acceleration is approximately proportional to the inclination angle expressed in radiant for small angles. This offers the possibility to measure the inclination simply by using accelerometers at the tower top, for example at or in the nacelle.

For discarding contributions to the inclination value which are not caused by tower vibrations and which are usually higher in frequency than those contributions caused by tower vibrations the derivative of the inclination value may be filtered by a low-pass filter.

In a first alternative of the inventive method, the pitch reference signal is determined on the basis of the modified speed reference value by establishing a speed difference value representing the difference between the rotor speed value and the modified speed reference value and determining the pitch reference signal on the basis of the speed difference value. Since the speed reference value is modified so as to take into account the tower vibrations these vibrations are damped. A PID-controller (proportional integral differential controller) may be used for calculating the pitch reference signal from the speed difference value.

In a second alternative of the inventive method, the pitch reference value is determined on the basis of the modified speed reference value by establishing a speed difference value representing the difference between the rotor speed value and the modified speed reference value, calculating a an inclination reference value for the tower, in particular for the tower top, for example for the nacelle, from the speed difference value, establishing an inclination difference value representing the difference between the inclination value and the inclination reference value, and determining the pitch reference value on the basis of inclination difference value. By determining the pitch reference value on the basis of the inclination difference value the inclination of the tower top can be counteracted by setting the pitch angle such as to reduce this difference. Furthermore, as the speed reference value is already modified so as to take into account the tower vibrations, not only the inclination is reduced but also the vibrations are damped, leading to a damping of fluctuations in the inclination value over time which in turn leads to damping the fluctuations in the inclination difference value. Hence, a rapid damping of the tower inclination can be achieved, which gives a more direct control of the tower movements and therefore makes it possible to get a stable control loop while having very low tower frequencies.

For calculating the inclination reference value from the speed difference value, a PID-controller may be used. Such a controller may also be used for calculating the pitch reference value from the inclination difference value.

In a special embodiment of the second alternative the inclination reference value may be clamped to a given value. By this method it becomes possible to avoid large tower movements caused by wave loads from the sea. Such a given value may, for example depend on the wind speed.

In both alternatives, the inventive method may be deactivated in case of very high wind speeds. This offers the opportunity to determine the pitch reference value on the speed reference value alone in order to avoid overspeed at high wind speeds.

In addition to the described method, the tower speed or the derived inclination could also be fed into the speed reference for a power controller in order to damp tower movements if the wind turbine runs below rated power. Furthermore it could be fed into the speed in a power/speed table which is used at speed below rated power for looking up a speed for a certain power.

An inventive control system for use in a wind turbine which is equipped with rotor blades and a pitch actuator system comprises a pitch control unit, which may, e.g., be implemented as a PID-controller, a rotor speed input, a speed reference input, an inclination signal input, a pitch reference output, and a modification unit. The pitch control unit is designed to establish a pitch reference signal representing a pitch to be set by the pitch actuator system. The rotor speed input and the speed reference input are designed for receiving a rotor speed signal representing the actual rotor speed and a speed reference signal for the rotor speed, respectively. The inclination signal input is designed for receiving a signal representing an inclination of the tower. The inclination signal can, in particular, represent the inclination at the tower top and can contain either a direct inclination value or a value from which the inclination can be derived. The pitch reference output is designed for outputting the pitch reference signal. The modification unit is connected to the speed reference input for receiving the speed reference signal and to the inclination signal input for receiving the inclination signal. It is designed to establish a modification signal on the basis of the inclination signal, to modify the speed reference signal by means of the modification signal, and to output a modified speed reference signal. It further comprises a first subtraction unit which is connected to the modification unit for receiving the modified speed reference signal and to the rotor speed input for receiving the rotor speed signal, and which is designed to establish a speed difference signal representing the difference between the rotor speed signal and the modified speed reference signal. Moreover, the pitch control unit is connected to the first subtraction unit to receive the speed difference signal and is designed to establish the pitch reference value on the basis of at least the speed difference signal.

Modifying the speed reference signal allows for rapidly reducing oscillations in the rotor speed and, as a consequence, the tower movements. The inventive control system allows for performing the inventive method and achieves the advantages associated with the inventive method.

In a particular embodiment of the inventive control system, the modification unit is designed to establish, as the modification signal, a tower velocity signal on the basis of a signal representing an inclination of the tower. It is further designed to modify the speed reference signal by means of the tower speed signal and to output the modified speed reference signal.

In a special implementation, the modification unit comprises a differentiator for differentiating the signal representing an inclination of the tower. In addition, the modification unit is designed to establish the tower velocity signal on the basis of the differentiated signal. In order to discard contributions in the modified speed reference signal which do not result from low frequency vibrations, the modification unit of the inventive control system may comprise a low-pass filter which is connected to the differentiator for receiving the differentiated signal and designed to output a filtered differentiated signal so that the tower velocity signal is established on the basis of the filtered differentiated signal.

In addition, the modification unit may comprise an amplifier which is connected to the low pass filter for receiving the filtered differentiated signal and designed to output an amplified filtered differentiated signal, so that small filtered differentiated signals can be more easily processed. Moreover, the modification unit may comprise a limiter which is connected to the amplifier for receiving the amplified filtered differentiated signal and designed to drive the amplified filtered differentiated signal into saturation if a given margin of the amplified filtered differentiated signal is reached and to output a saturated amplified filtered differentiated signal. By this measure a too strong amplified filtered differentiated signal can be avoided from being processed.

In this special implementation, the modification unit may further comprise an adder which is connected to the speed reference input for receiving the speed reference signal and designed to add the tower velocity signal to the speed reference input for establishing the modified speed reference signal. Hence, the modified speed reference signal is the sum of the speed reference signal and the tower velocity signal. Since the tower velocity is oscillating due to the vibrations this sum represents an oscillating speed reference for the pitch controller. By use of this oscillating speed reference the difference between the (oscillating) actual rotor speed and the oscillating speed reference can be reduced in a control process. By this measure it becomes possible to rapidly damp oscillations in the rotor speed.

An effective damping of the tower inclination can be achieved by the special implementation if the pitch control unit comprises a speed controller, a second subtraction unit, and an inclination controller. The speed controller is connected to the first subtraction unit for receiving the speed difference signal and designed to establish and to output an inclination reference signal based on the received speed difference signal. The second subtraction unit is connected to the speed controller for receiving the inclination reference signal and connected to the inclination signal input for receiving the inclination signal. It is designed to establish the difference between the inclination reference signal and the inclination signal, and to output an inclination difference signal. The inclination controller is connected to the second subtraction unit for receiving the inclination difference signal and designed to establish the pitch reference signal on the basis of the received inclination difference signal. In this development of the control system the speed controller calculates an oscillating inclination reference signal on the basis of the oscillating speed reference from which then the actual (oscillating) inclinations are subtracted. The subtraction result is fed into the inclination controller which determines a pitch reference signal on the basis of the subtraction result so as to reduce the difference. By this measure the difference between the inclination reference signal and the actual inclination can be reduced rather quickly which in turn leads to an effective damping of oscillations in the tower inclination.

The speed controller and/or the inclination controller may be implemented as PID-controllers.

BRIEF DESCRIPTION OF THE DRAWINGS

Further features, properties, and advantages of the present invention will become clear from the following description of embodiments of the invention in conjunction with the accompanying drawings.

DETAILED DESCRIPTION OF INVENTION

Figure 1:
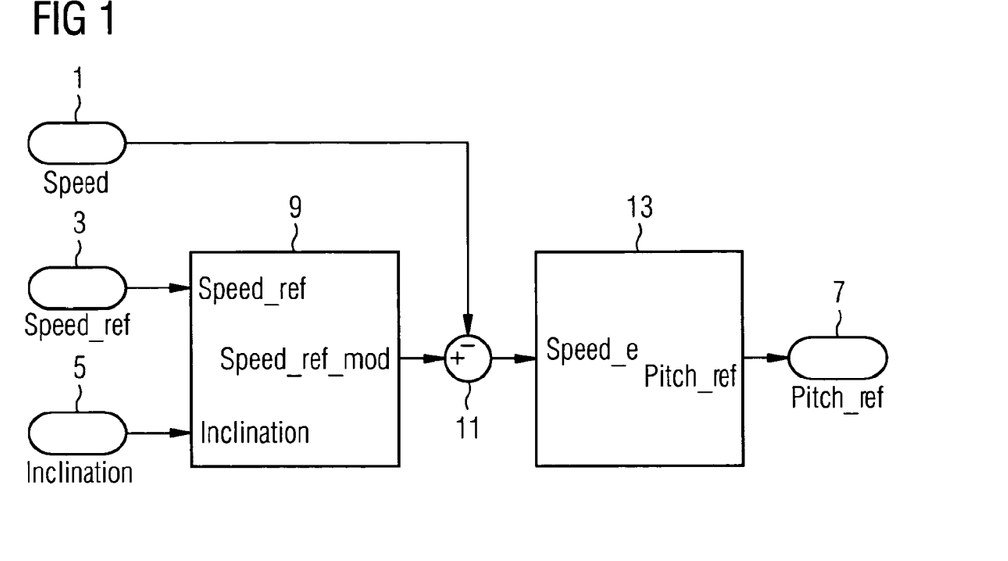
FIG. 1 shows an embodiment of the inventive control system in form of a block diagram.

An embodiment of the inventive control system is shown in FIG. 1. The system is to be used in a wind turbine which is equipped with rotor blades and a pitch actuator system. It comprises three inputs, namely a rotor speed input 1 which is designed for receiving a rotor speed signal representing the actual rotor speed value of the wind turbine's rotor, a speed reference input 3 which is designed for receiving a speed reference signal representing a speed reference value for the rotor speed, and an inclination signal input 5 which is designed for receiving a signal representing an inclination of the tower. The control system further comprises a pitch reference output 7 which is designed to output a pitch reference signal to the pitch actuator system of the wind turbine. The pitch reference signal represents the pitch values to be set by the pitch actuator system.

A modification unit 9 is connected to the speed reference input 3 for receiving the speed reference signal and to the inclination input 5 for receiving the inclination signal. A modification signal is established in the modification unit on the basis of the received inclination signal and used to modify the speed reference signal so as to establish a modified speed reference signal. This modified speed reference signal is then output by the modification unit 9.

A subtracter 11 is connected to the modification unit 9 for receiving the modified speed reference signal and to the rotor speed input 1 for receiving the rotor speed signal representing the actual rotor speed value. It subtracts the rotor speed signal from the modified speed reference signal to establish a speed error signal (speed difference signal) which is then output.

The pitch controller 13 is, in the present embodiment, connected to the first subtracter 11 to receive the speed error signal. It is implemented as a PID-controller which derives the pitch reference signal from the speed error signal. The pitch reference signal, which represents an individual or a global pitch for each rotor blade to be set by the pitch actuating system of the wind turbine, is then output through the pitch reference output 7.

The inclination signal can be a signal which represents a direct inclination value measured by a suitable sensor. However, it is also possible to have an inclination signal which not directly represents the inclination value but a parameter which allows for deriving the inclination value from it. Such a parameter is, for example, the fore-aft acceleration of the nacelle. How to derive the inclination value from the fore-aft acceleration will now be described in conjunction with FIG. 2.

Figure 2:
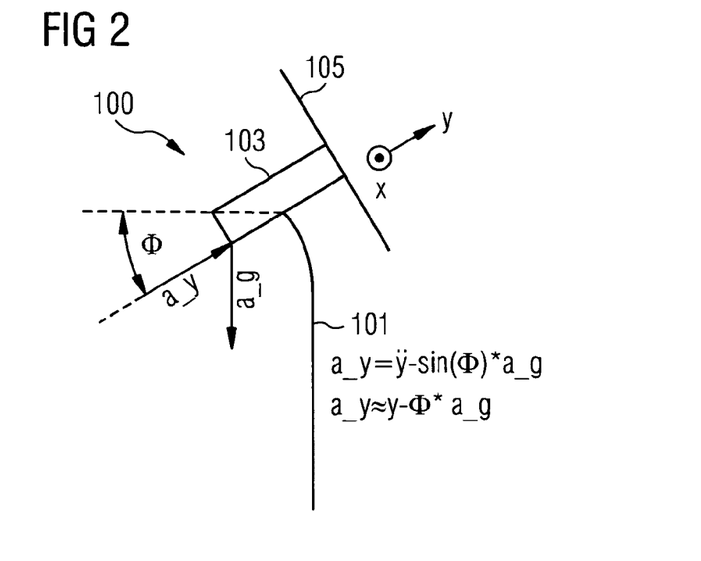
FIG. 2 shows the inclination of a wind turbine tower and the accelerations acting on the nacelle of a wind turbine.

FIG. 2 shows a wind turbine 100 with a tower 101, a nacelle 103 at the tower at the tower top and a rotor 105 the shaft of which is carried by the nacelle 103. The wind turbine 100 is subject to tower vibrations which in turn lead to an oscillating inclination $\Phi$ of the wind turbine. The oscillation also produces a fore-aft acceleration a_y of the nacelle, i.e. an acceleration of the nacelle in the direction of the rotor axis y. The inclination angle $\Phi$ is defined to be the angle between the fore-aft acceleration a_y of the nacelle 103 and the horizontal direction. In addition, gravity acceleration a_g is acting on the nacelle as well in a vertical direction.

The fore-aft acceleration a_y depends on the second time derivative of the nacelle's location in the direction of the rotor axis, $dy/d^2t$ and the sine of the inclination angle $\Phi$ multiplied by the gravity acceleration a_g, i.e. the projection of the gravity acceleration onto the direction of the rotor axis. Even in case of an inclination angle as large as 20°, the sine function of this angle is very well approximated by this angle itself if the angle is expressed in radiant instead of degrees. The error by replacing the sine of the inclination angle Φ by the inclination angle Φ itself in radiant is only about 2 percent for angles as large as 20°. For smaller angles the error becomes even smaller. This means that the inclination angle can be well approximated by the ratio of the fore-aft acceleration a_y to the gravity acceleration a_g. In other words, since the gravity acceleration is constant, the inclination angle can be assumed to be proportional to the fore-aft acceleration value a_y. Furthermore, it can be assumed that the acceleration $dy/d^2t$ caused by the vibrations can always be neglected compared to the projection of the gravity acceleration onto the direction of the rotor axis. Please note in this context that the projection of the gravity acceleration as well as the acceleration caused by the low frequency vibrations are the highest for the highest inclination angles Φ, and that the acceleration due to low frequency vibrations is considerably small compared to gravity acceleration. Therefore, the fore-aft acceleration value a_y can be used to represent the inclination angle Φ in the modification unit 9.

Figure 3:
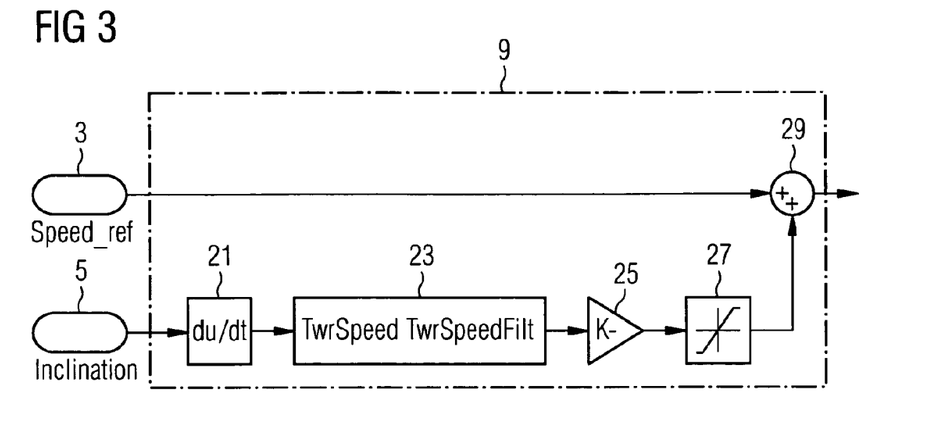
FIG. 3 shows the modification unit of the control system.

FIG. 3 shows the modification unit 9 in more detail. In FIG. 3 it is assumed that the inclination signal is given by a fore-aft acceleration signal which represents the fore-aft acceleration value measured by, e.g., an accelerometer at or in the nacelle 103. However, the modification unit 9 would work as well with an inclination signal representing directly the inclination angle rather than the fore-aft acceleration value.

The modification unit 9 comprises a differentiator 21, a low-pass filter 23, an amplifier 25, a limiter 27, and an adder 29. The differentiator 21 is connected to the inclination input 5 for receiving the fore-aft acceleration signal. It forms the time-derivative of the fore-aft acceleration signal which then is the output signal of the differentiator. As has been explained before, the fore-aft acceleration signal can be assumed to be proportional to the inclination angle Φ. Hence, the time derivative of the fore-aft acceleration signal is also proportional to the time derivative of the inclination angle, which in turn is proportional to the tower speed. Hence, with the known constants of proportionality the time derivative of the fore-aft acceleration signal is a good approximation for the tower speed. Therefore, this derivative can be regarded as being a tower speed signal.

The low-pass filter 23 is connected to a differentiator 21 to receive the tower speed signal, i.e. the time derivative of the fore-aft acceleration signal. The output signal of the low-pass filter 23 is a filtered tower speed signal from which high frequency components, which are not caused by low frequency tower vibrations, are removed.

The amplifier 25 is connected to the low-pass filter 23 to receive the filtered tower speed signal. In the amplifier 25 the received tower speed signal is amplified and output as an amplified filtered tower speed signal.

The limiter 27 is connected to the amplifier 25 for receiving the filtered and amplified tower speed signal. It drives the filtered and amplified tower speed signal into saturation if a certain margin of the signal amplitude is reached. By this measure the filtered and amplified tower speed signal is prevented from becoming too large in its absolute value.

The output of the limiter 27 is the modification signal which is received by the adder 29 that is connected to the limiter 27 and to the speed reference input 3. In the adder 29 the modification signal is added to the speed reference signal and the sum is output as the modified speed reference signal.

Although FIG. 3 has been described with respect to the fore-aft acceleration signal as the inclination signal, the modification unit would work with an inclination signal representing the actual inclination of the tower rather than its fore-aft acceleration, as well. In this case the differentiator would form the time derivative of the inclination angle rather than the fore-aft acceleration.

Figure 4:
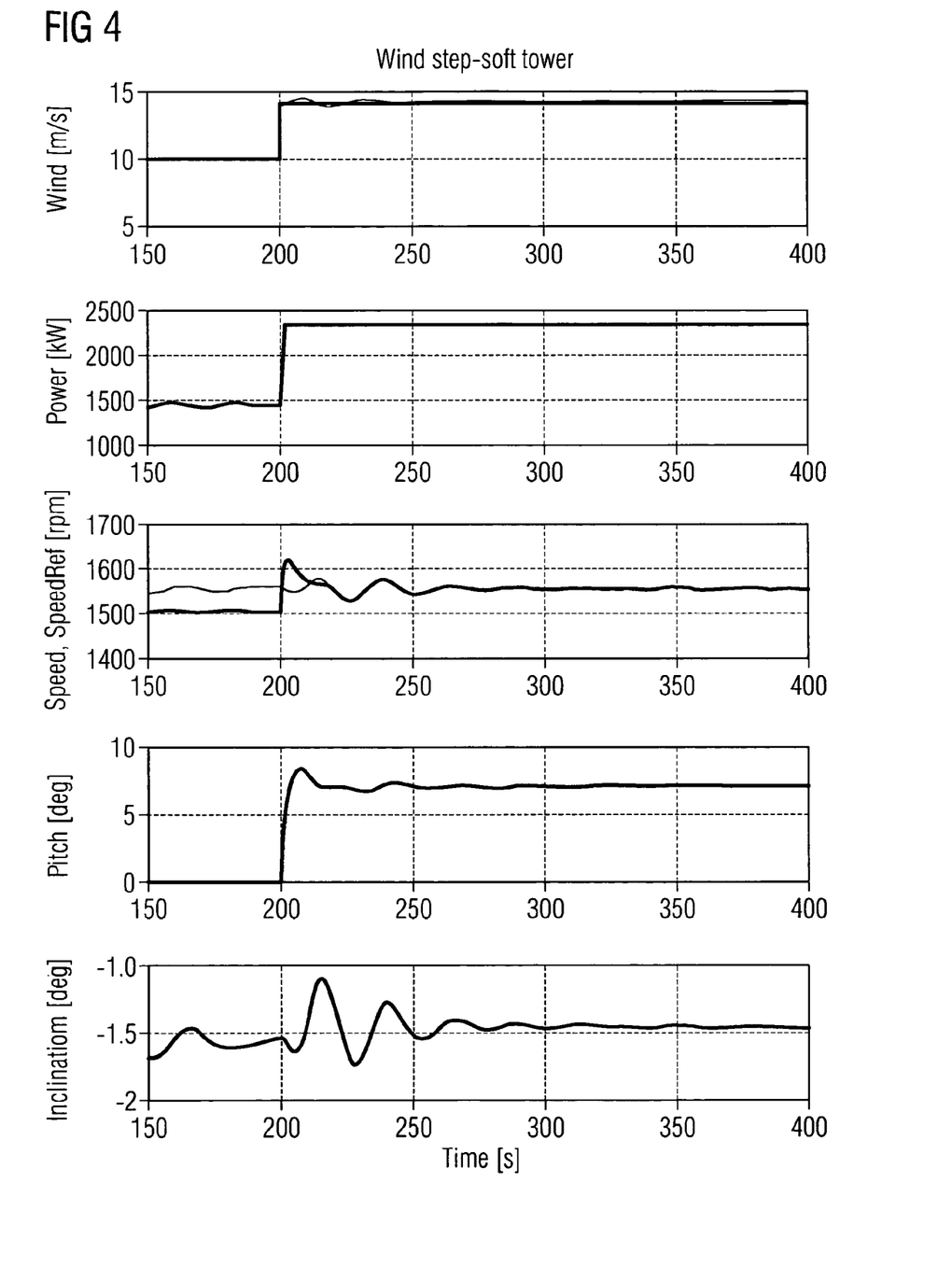
FIG. 4 shows the time dependency of various parameters in a wind turbine with an inventive control system.
Figure 5:
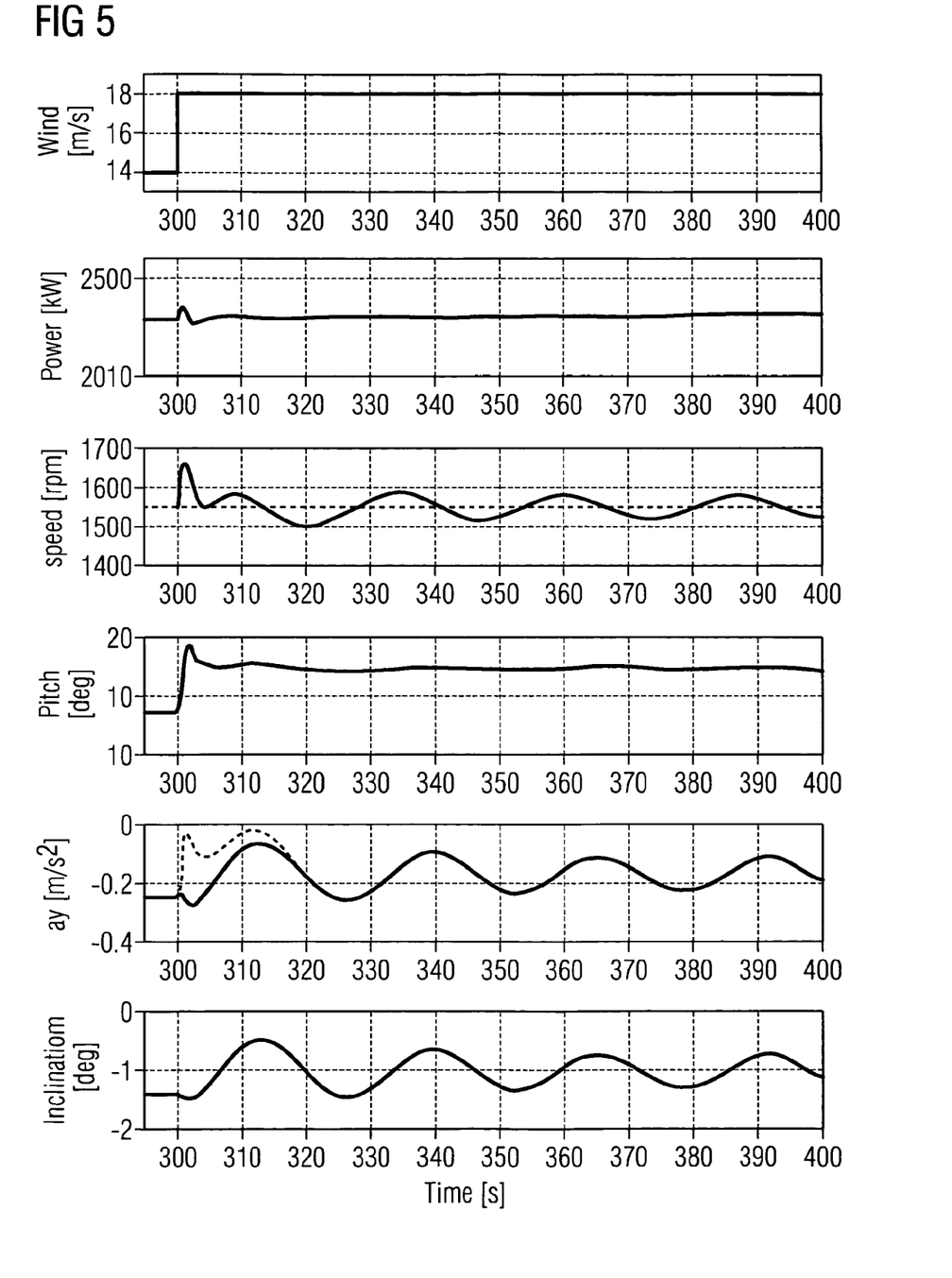
FIG. 5 shows the time dependency of the parameters of FIG. 4 for a wind turbine without an inventive control system.
Figure 6:
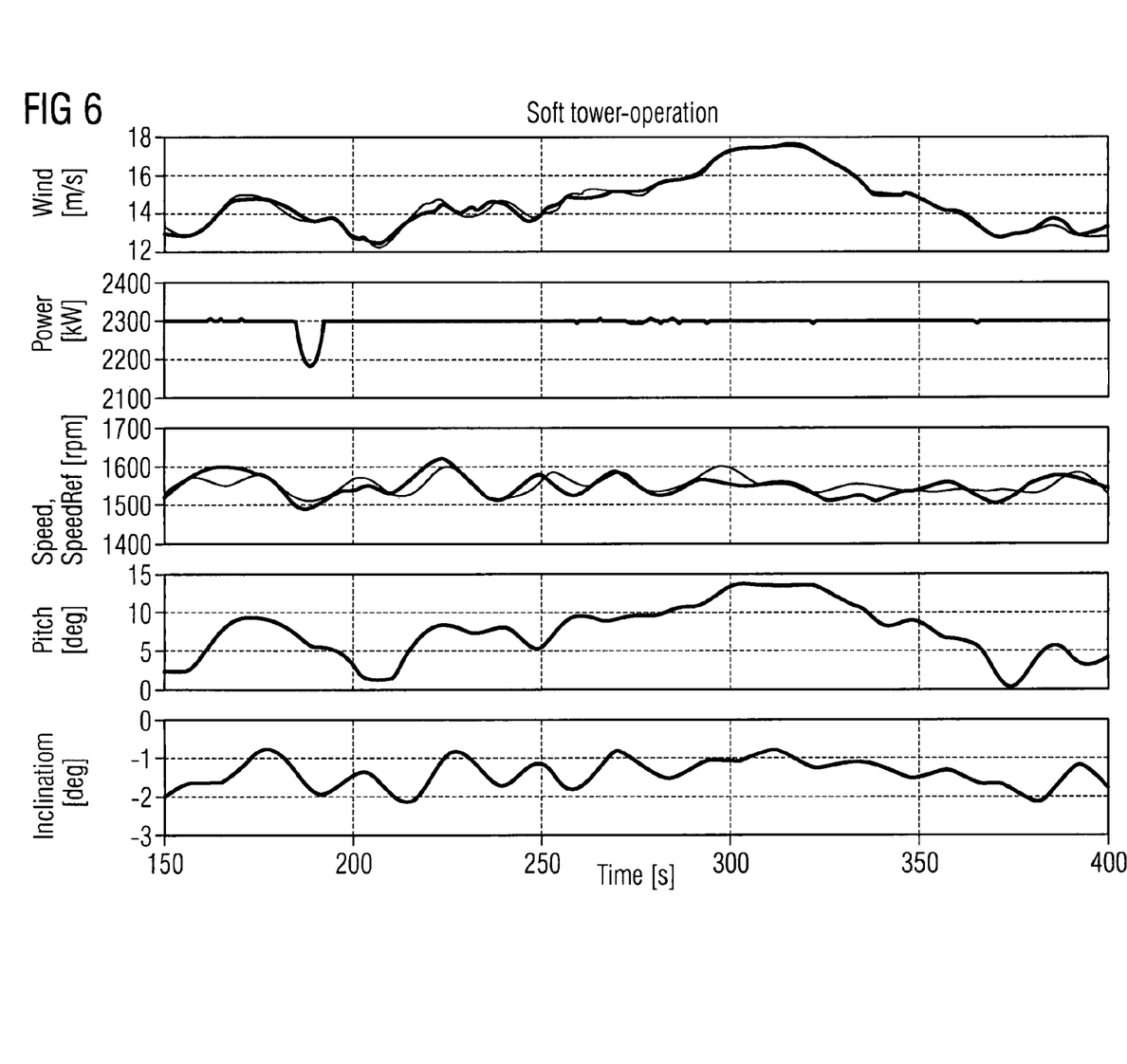
FIG. 6 shows the time dependency of the parameters of FIG. 4 in a usual operation of the wind turbine.

The effect of the inventive control system can be seen in FIGS. 4 to 6 which show the time behavior of the wind speed, the output power of the wind turbine, the rotor speed, the pitch angle, the fore-aft acceleration (FIG. 5), and the inclination for a wind turbine with an inventive control system (FIG. 4 and FIG. 6) and without such a system (FIG. 5). FIGS. 4 and 5 show the reaction of the output power, the rotor speed, the pitch angle, the fore-aft acceleration (FIG. 5), and the inclination to a wind step, i.e. to a sudden increase in the wind speed, by 4 m/s (from 10 to 14 m/s in FIG. 4 and from 14 to 18 m/s in FIG. 5). In FIG. 5, the output power of the wind turbine stays constant except for a small wobble immediately after the wind step. This constancy is due to the fact that in FIG. 5 the wind turbine is operated in rated power mode.

Due to the low frequency tower oscillation that is introduced through the wind step the rotor speed experiences oscillations. While these variations are counteracted in the inventive control system through the modification signal added to the speed reference signal, as shown in FIG. 4, no measures are taken in the wind turbine shown in FIG. 5. As a consequence, the speed error, i.e. the difference between the speed signal and the speed reference signal, is controlled to become zero rather quickly with the inventive control system so that the oscillations in the rotor speed are damped while long-term stable oscillations occur in the wind turbine without the inventive control system. As a consequence, oscillations in the tower inclination are damped effectively. On the other hand, in the wind turbine without the inventive control system, the long-term stable oscillations of the rotor speed can also be seen in the inclination angle. In other words, the low frequency oscillations are damped effectively with the inventive control system while they continue almost undamped in the wind turbine without the inventive control system. Therefore, the inventive control system provides a suitable measure for damping low frequency oscillations, as they, for example, would occur in wind turbines with floating foundations.

FIG. 6 shows a simulation of a wind turbine which runs under usual operation conditions. The figure shows the same parameters as FIG. 4. As can be seen, the inclination varies only about 1 degree for wind speeds varying between 12 and nearly 18 m/s.

Figure 7:
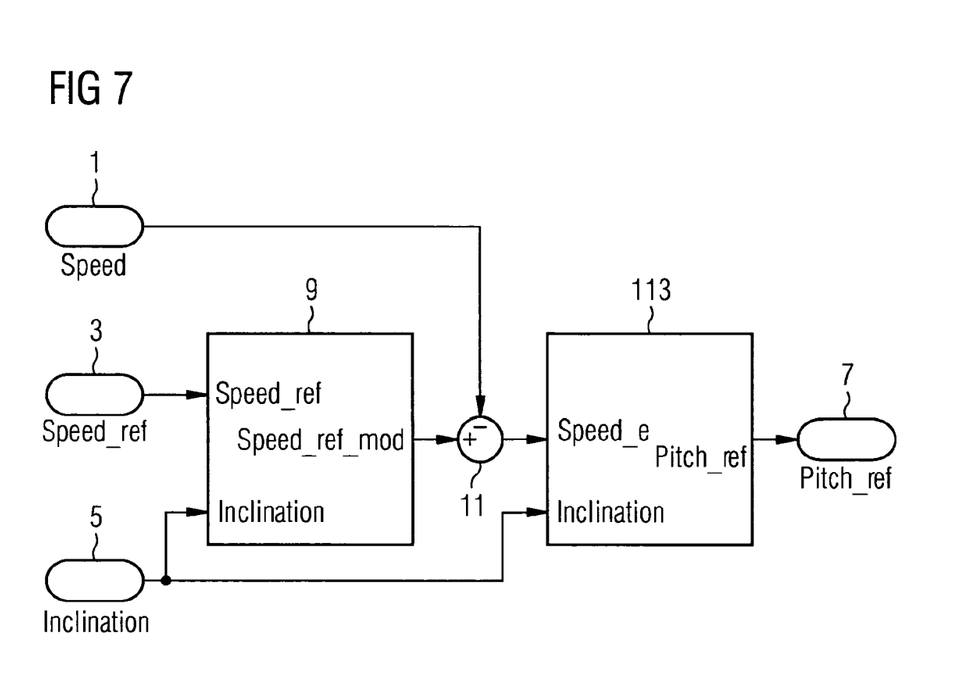
FIG. 7 shows a modification of the embodiment shown in FIG. 1 in form of a block diagram.

A modification of the inventive control system will now be described with respect to FIGS. 7 and 8.

The modified control system differs from the control system shown in FIGS. 1 and 3 in the pitch controller 113. In the modified control system, the pitch controller 113 is not only connected to the first subtracter 11 to receive the speed error signal but also to the inclination input 5 to receive the inclination signal. The pitch controller 113 establishes the pitch reference signal, which represents an individual or a global pitch for each rotor blade to be set by the pitch actuating system of the wind turbine, on the basis of the received speed error signal and the received inclination signal. The pitch reference signal is then output through the pitch reference output 7.

Figure 8:
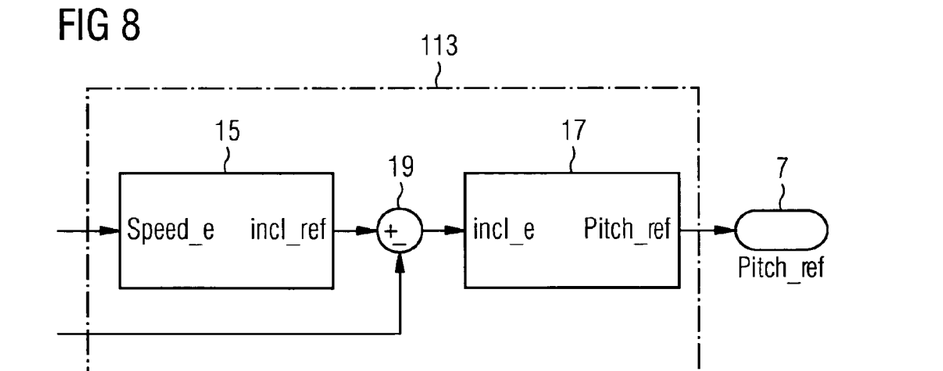
FIG. 8 shows the pitch controller of the modification shown in FIG. 7.

The pitch controller 113 of the modified control system is shown in more detail in FIG. 8. It comprises a speed controller 15, an inclination controller 17 and a second subtracter 19. Both the speed controller 15 and the inclination controller 17 are implemented as proportional-integral-differential controllers (PID-controllers).

The speed controller 15 is connected to the first subtracter 11 to receive the speed error signal. The PID-controller then establishes an inclination reference signal on the basis of the received speed error signal. This inclination reference signal is the output signal of the speed controller 15.

The second subtracter 19 is connected to the speed controller 15 to receive the inclination reference signal and to the inclination input 5 to receive the inclination signal. It subtracts the inclination signal from the inclination reference signal and outputs an inclination error signal (inclination difference signal), which represents the difference between the inclination reference and the actual inclination of the wind turbine.

The inclination controller 17 is connected to the subtracter 19 to receive the inclination error signal. The PID-controller establishes on the basis of the received inclination error signal the pitch reference signal which is then output to the pitch actuator system through the pitch reference output 7. The pitch reference signal represent the pitch angles to be set for the rotor blades in order to reduce the difference between the inclination reference and the actual inclination.

Figure 9:
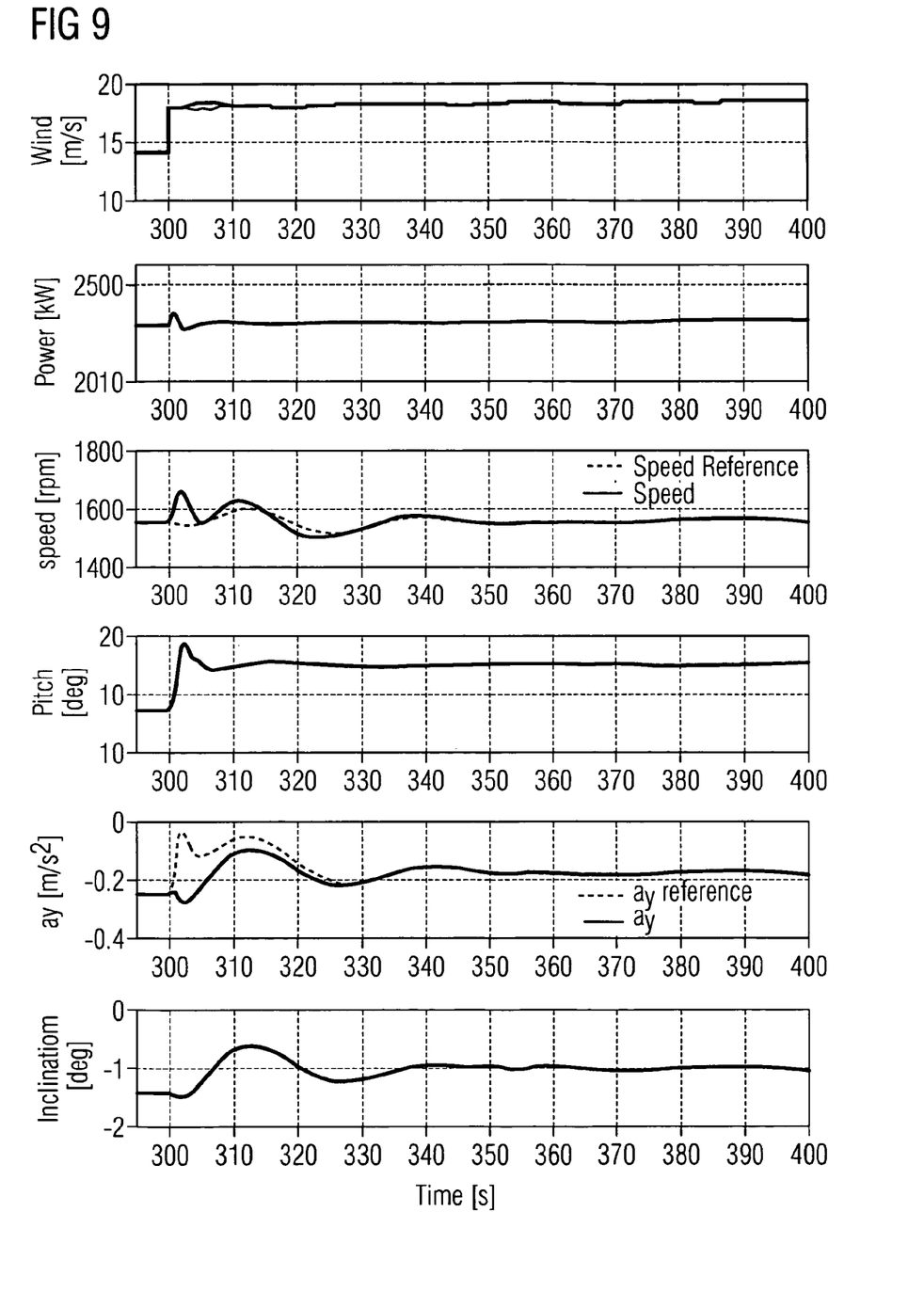
FIG. 9 shows the time dependency of various parameters in a wind turbine with an control system according to FIG. 7.

The effect of the inventive control system can be seen in FIG. 9 which show the time behavior of the wind speed, the output power of the wind turbine, the rotor speed, the pitch angle, the fore-aft acceleration, and the inclination for a wind turbine with an inventive control system. The effect is compared with a wind turbine without such a system (FIG. 5). FIGS. 9 and 5 show the reaction of the output power, the rotor speed, the pitch angle, the fore-aft acceleration, and the inclination to a wind step, i.e. to a sudden increase in the wind speed from 10 to 14 m/s. The output power of the wind turbine stays constant in both cases except for a small wobble immediately after the wind step. This constancy is due to the fact that the wind turbine is operated in rated power mode.

Due to the low frequency tower oscillation that is introduced through the wind step the rotor speed experiences oscillations. While these variations are counteracted in the inventive control system through the modification signal added to the speed reference signal, as shown in FIG. 9, no measures are taken in the wind turbine shown in FIG. 5. As a consequence, the speed error, i.e. the difference between the speed signal and the speed reference signal, is controlled to become zero rather quickly with the inventive control system so that the oscillations in the rotor speed are damped while long-term stable oscillations occur in the wind turbine without the inventive control system. At the same time, the inclination reference signal, which is a fore-aft acceleration reference signal in the present case, also contains the oscillations from the modified speed reference signal. Due to the damping of the oscillations in the rotor speed the inclination error signal, i.e. the difference between the fore-aft acceleration reference and the actual fore-aft acceleration is controlled to become zero rather quickly so that, as a consequence, the amplitudes in the inclination angles are damped. On the other hand, in the wind turbine without the inventive control system, the long-term stable oscillations of the rotor speed can also be seen in the fore-aft acceleration of the nacelle and, as a consequence, in the inclination angle. In other words, the low frequency oscillations are damped effectively with the inventive control system while they continue almost undamped in the wind turbine without the inventive control system. Therefore, the inventive control system provides a suitable measure for damping low frequency oscillations, as they, for example, would occur in wind turbines with floating foundations.

Line in the embodiment shown in FIGS. 1 and 3, the inclination may be represented by the fore-aft acceleration of, e.g., the tower top. In case the fore-aft acceleration is used for representing the inclination the fore-aft acceleration may also be used in the pitch controller 113. However, it is also possible to use the inclination angle instead of the fore-aft acceleration in the modification unit 9 as well as in the pitch controller 113. It is also possible to use the inclination angle in one unit and the fore-aft acceleration in the other. However, in this case the control system would need to have four inputs, namely a rotor speed input, a speed reference input, a fore-aft acceleration input and an inclination angle input. Therefore, it is preferable to use the same input signal in the modification unit 9 and in the pitch controller 113.

The invention claimed is:

1. A method of damping tower vibrations of a wind turbine which is equipped with rotor blades, a pitch controller and a pitch actuator system, by controlling the pitch angle of the rotor blades, the method comprising:
   providing a speed reference value for an actual rotor speed;
   providing a rotor speed value representing a speed reference speed of the rotor speed; and
   establishing a modification value representing a modification to be done to the rotor speed value for taking into account the tower vibrations;
   modifying the speed reference value with the modification value to establish a modified speed reference value;
   determining a pitch reference value representing a pitch to be set by the pitch actuator system, the pitch reference value based on at least a difference between the modified speed reference value and the rotor speed value; and
   controlling the pitch angle of the rotor blades according to the pitch reference value.

2. The method as claimed in claim 1,
   wherein the modification value is a tower velocity value representing a tower velocity caused by the tower vibrations, and
   wherein the tower velocity value is added to the speed reference value to establish the modified speed reference value.

3. The method as claimed in claim 2, wherein the tower velocity value is calculated from an inclination value representing an inclination of the tower caused by the tower vibrations.

4. The method as claimed in claim 3, wherein a fore-aft acceleration value representing a tower acceleration in a direction of a rotor axis caused by the tower vibrations is used to represent the inclination of the tower.

5. The method as claimed in claim 4, wherein the inclination value is derived from the fore-aft acceleration value by forming a derivative of a ratio of the fore-aft acceleration value to gravity acceleration.

6. The method as claimed in claim 3, wherein the tower velocity value is established from a low-pass filtered derivative of the inclination value.

7. The method as claimed in claim 3, wherein the pitch reference signal is determined based on the modified speed reference value by establishing a speed difference value representing the difference between the rotor speed value and the modified speed reference value and determining the pitch reference signal on the basis of the speed difference value.

8. The method as claimed in claim 7, wherein a proportional integral differential controller is used for calculating the pitch reference signal from the speed difference value.

9. The method as claimed in claim 3, wherein the pitch reference signal is determined on the basis of the modified speed reference value by:

establishing a speed difference value representing the difference between the rotor speed value and the modified speed reference value;

calculating an inclination reference value for the tower from the speed difference value;

establishing an inclination difference value representing the difference between the inclination value and the inclination reference value; and determining the pitch reference signal on the basis of the inclination difference value.

10. The method as claimed in claim 9, wherein a proportional integral differential controller is used for calculating the inclination reference value from the speed difference value.

11. The method as claimed in claim 9, wherein a proportional integral differential controller is used for calculating the pitch reference value from the inclination difference value.

12. The method as claimed in claim 9, wherein the inclination reference value is assigned a given value which depends on the wind.

13. The method as claimed in claim 1, wherein the method is deactivated at very high wind speeds.

14. The method as claimed in claim 1, wherein the inclination value is established based on a inclination measurement or an acceleration measurement at the top of the tower.

15. A control system for use in a wind turbine with rotor blades and a pitch actuator system, the control system comprising:

a rotor speed input receives a rotor speed signal representing an actual speed of the rotor;

a speed reference input receives a speed reference signal for a rotor speed;

an inclination signal input receives a signal representing an inclination of a tower of the wind turbine;

a pitch reference output for outputting the pitch reference signal;

a modification unit connected to the speed reference input and to the inclination signal input, the modification unit establishes a modification signal based the inclination signal, modifies the speed reference signal via the modification signal, and outputs a modified speed reference signal; and a first subtraction unit connected to the modification unit and to the rotor speed input, the first subtraction unit to establish a speed difference signal representing the difference between the rotor speed signal and the modified speed reference signal; and a pitch control unit to establish a pitch reference signal representing a pitch to be set by the pitch actuator system, the pitch control unit connected to the first subtraction unit to receive the speed difference signal and the pitch control unit to establish the pitch reference value at least based on of the speed difference signal.

16. The control system as claimed in claim 15, wherein the modification unit:

establishes as the modification signal a tower velocity signal based on the signal representing an inclination of the tower, modifies the speed reference signal via the tower velocity signal, and outputs the modified speed reference signal.

17. The control system as claimed in claim 16, wherein the modification unit comprises a differentiator for differentiating the signal representing an inclination of the tower;

and the modification unit establishes the tower velocity signal on the basis of the differentiated signal.

18. The control system as claimed in claim 17, wherein the modification unit comprises a low pass filter which is connected to the differentiator and outputs a filtered differentiated signal.

19. The control system as claimed in claim 18, wherein the modification unit comprises an amplifier which is connected to the low pass filter and outputs an amplified filtered differentiated signal.

20. The control system as claimed in claim 18, wherein the modification unit comprises a limiter which is connected to the amplifier and drives the amplified filtered differentiated signal into saturation when a given margin of the amplified filtered differentiated signal is reached and outputs a saturated amplified filtered differentiated signal.

21. The control system as claimed in claim 17, wherein the modification unit comprises an adder which is connected to the speed reference input and adds the tower velocity signal to the speed reference signal for establishing the modified speed reference signal.

* * * * *